United States Patent [19]

Hargis

[11] 3,864,755

[45] Feb. 4, 1975

[54] THERMOFORMED CARTRIDGE FOR A MAGNETIC RECORD DISC

[75] Inventor: James V. Hargis, Saratoga, Calif.

[73] Assignee: Memorex Corporation, Santa Clara, Calif.

[22] Filed: Aug. 20, 1973

[21] Appl. No.: 389,993

[52] U.S. Cl. .................. 360/133, 206/62 P, 360/99

[51] Int. Cl. .......................................... G11b 5/16

[58] Field of Search ........... 360/86, 97, 98, 99, 133; 206/62 P

[56] References Cited

UNITED STATES PATENTS 3,303,485 2/1967 Lee ...................................... 360/99

*Primary Examiner*—Vincent P. Canney

*Attorney, Agent, or Firm*—Limbach, Limbach and Sutton

[57] ABSTRACT

A rotary magnetic record disc cartridge which has a relatively rigid, flat back cover and a relatively thin front cover which is thermoformed over the record disc and bonded to the flat back cover. Non-woven synthetic fiber front and back wiper layers are interposed between the surfaces of the magnetic disc and the inside surfaces of the front and back covers with the wiper layer attached to the back cover having a diameter sufficient that its outer circumferential edge abuts the junction of the front and back covers adjacent the outer edge of the memory disc.

7 Claims, 3 Drawing Figures

THERMOFORMED CARTRIDGE FOR A MAGNETIC RECORD DISC

BACKGROUND OF THE INVENTION

The present invention relates to a cartridge for a magnetic memory disc and more particularly to a cartridge for a flexible, interchangeable single memory disc.

Some types of computer magnetic disc files employ interchangeable discs which are flexible and known in the trade as "floppy discs." Such magnetic memory discs are contained in a cartridge type housing to keep the disc free from dust and contamination when not being used in the computer equipment. The disc housing normally has an aperture at its center to allow access to the center hole of the memory disc so that the disc may be rotated by the disc file equipment. Other apertures allow access for the magnetic transducers which pick up recorded signals on the memory disc.

In one known type of cartridge for a memory disc, as for example disclosed in U.S. Pats., Nos. 3,668,658 and 3,678,481,the magnetic memory disc is held in a recess in a spacing layer bonded between front and back covers. Each of the front and back covers is also provided with a wiping layer to clean the memory disc as it is rotated. This front cover-spacing layer-back cover three layer construction is relatively costly when it is considered that such memory disc cartridges are designed as a basically low cost piece of equipment.

It has been suggested that the spacing layer may be eliminated by vacuum-forming the front and back covers around the memory disc. This is not feasible, however, because such a vacuum-formed cartridge would have a V-shaped junction in the memory disc's plane of rotation where the front and back covers joined together. The rotating memory disc would be destroyed if its outer edge became jammed in such a junction. One purpose served by the intermediate spacing layer of the above noted prior art cartridge construction is to prevent the edge of the memory disc from engaging with this junction.

The present invention overcomes these and other disadvantages of the prior art by a novel design which additionally simplifies the manufacturing process of such memory disc cartridges.

SUMMARY OF THE INVENTION

The present invention of a cartridge for containing a flexible, rotary magnetic record disc comprises a relatively rigid, flat first cover and a thin second cover which is deformed to provide a recess which is substantially coextensive with the circumferential edge of the memory disc. The second cover is bonded to the flat first cover along a path immediately adjacent to the outer edge of the recess to provide a circumferentially sealed cavity for housing the memory disc. The junction of the first and second covers, thus, lies in substantially the same plane as the surface of the first cover which faces the memory disc. The first and second covers are separated from the memory disc by a pair of wiper layers, the dimension of the wiper layer adjacent to the first cover being such that its outer circumferential edge abuts the junction of the first and second covers to prevent the edge of the memory disc from becoming jammed in the cover junction.

In the preferred embodiment of the invention, the first cover is roughly four times as thick as the second cover and both covers are made of a high impact plastic material. The wiper layers are made of a non-woven synthetic fiber. The wiper layers serve to provide low friction, anti-static surfaces and to wipe the memory disc free of dust and dirt particles.

Apertures are provided in both the first and second covers to allow the magnetic transducing apparatus to have access to the memory disc. A second set of apertures are provided in the first and second covers at the outer edge of the memory disc to allow a photo-electric transducer apparatus in the disc file equipment to sense the passage of holes punched in the outer edge of the rotating memory disc to thereby generate a sector signal in a manner known to those skilled in the computer equipment art.

It is, therefore, an object of the present invention to provide a simplified construction of a cartridge for a flexible memory disc.

It is also an object of the invention to provide a two layer construction cartridge for a flexible memory disc which protects the rotating memory disc from destruction due to jamming in the crevices of the cartridge.

The foregoing and other objectives, features and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
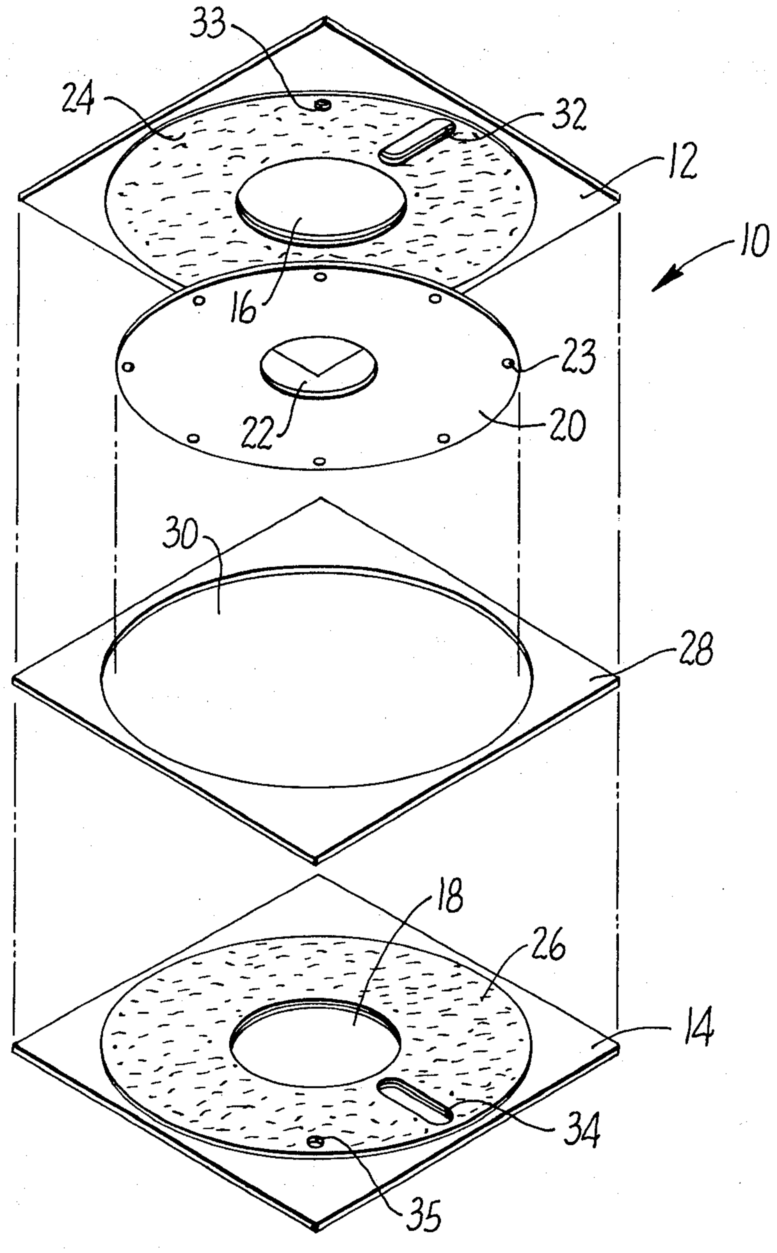
FIG. 1. PRIOR ART
FIG. 1 is a perspective, exploded view showing one type of construction of a cartridge for a single, flexible memory disc according to the prior art.

Referring now more particularly to FIG. 1, a prior art cartridge, designated generally 10, of the type described in the above noted patents is depicted in FIG. 1. A top cover 12 and a bottom cover 14, each having a generally square configuration, are provided with center holes 16 and 18, respectively. A memory disc 20 is placed between the covers 12 and 14. The memory disc 20 has a center hole 22 which, when the cartridge is completely constructed, is in alignment with the holes 16 and 18 of the covers 12 and 14, respectively. The hole 22 of the memory disc 20 has a smaller diameter than the holes 16 and 18 so that a center portion of the memory disc 20 is exposed through the holes 16 and 18. When the memory disc cartridge is utilized in a computer system, this exposed portion of the memory disc 20 is gripped by a disc file memory device (not shown) which rotates the disc 20 within the cartridge 10.

The interior surfaces of the covers 12 and 14 which contact the memory disc 20 are coated with wiper layers 24 and 26, respectively, made of a porous, low-friction, anti-static material. The memory disc 20 is surrounded by a square shaped spacing layer 28 which has a center hole 30 of a diameter slightly greater than the diameter of the memory disc 20. When the covers 12 and 14 are bonded to the opposite sides of the spacing layer 28 a partially sealed cavity is provided for housing the memory disc 20. Each of the layers 12 and 14 has an oval shaped hole 32 and 34, respectively, which spans the surface of the magnetic disc 20 in a radial direction to allow a magnetic transducer head from the disc file device (not shown) to have access to the opposite magnetic surfaces of the memory disc 20.

A plurality of holes 23 are evenly spaced about the outer edge of the memory disc 20. The covers 12 and 14 have aligned holes 33 and 35, respectively, located so that as the memory disc is rotated a light beam from the disc file device (not shown) will impinge on a photo-electric cell within the disc file device to generate a sector signal.

Figure 2:
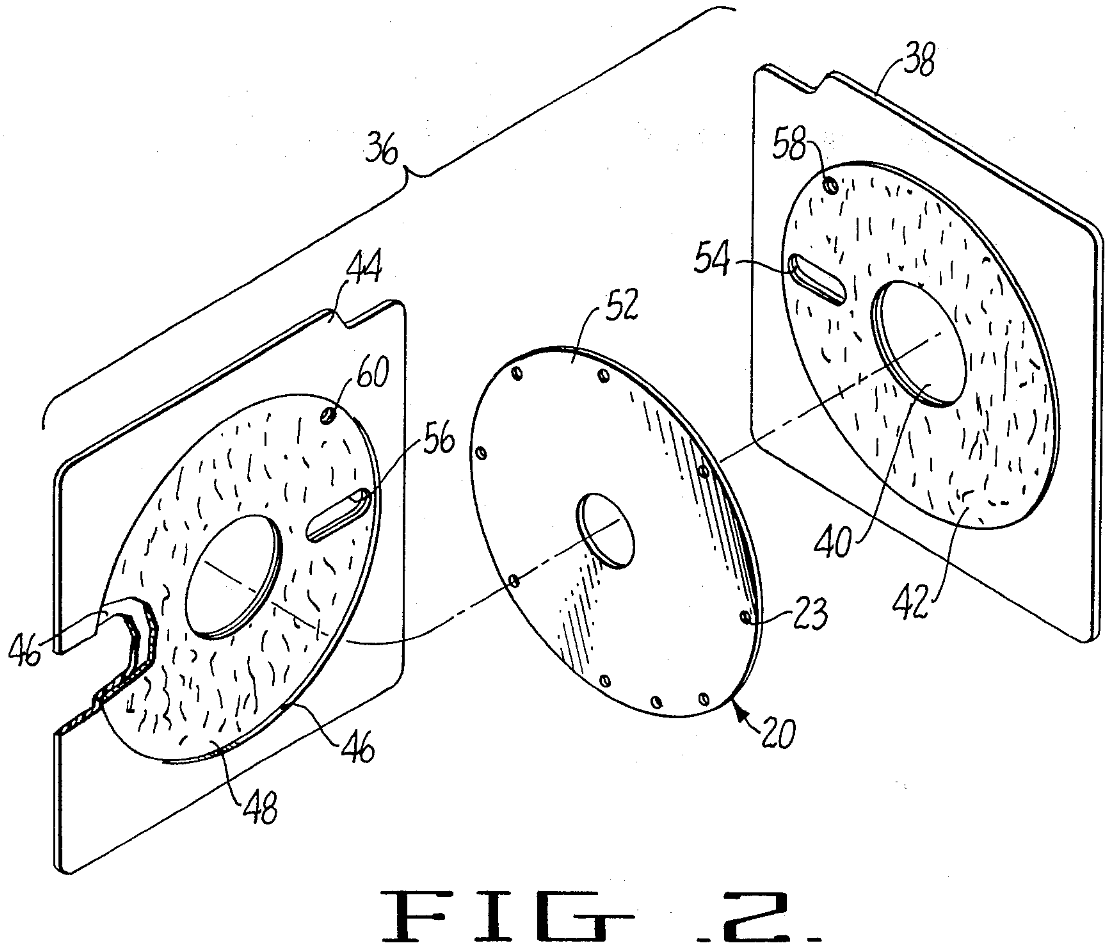
FIG. 2 is a perspective, exploded view with portions broken away and in section of a cartridge according to the invention for a single, flexible memory disc.
Figure 3:
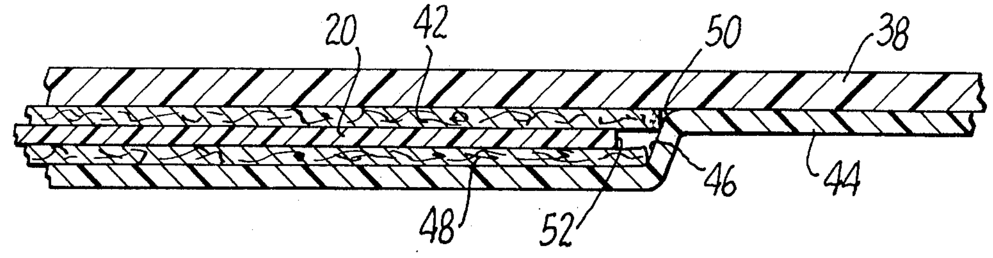
FIG. 3 is a side view in section of the embodiment depicted in FIG. 2.

Referring now more particularly to FIGS. 2 and 3, a memory disc cartridge 36 according to the invention is shown as having a more simplified construction than the cartridge described above with reference to FIG. 1. A back cover 38 having a generally square shape and being made of a relatively thick and flat layer of high impact plastic is provided with a center hole 40 and a layer of anti-friction, anti-static wiping material 42 on one of its surfaces. The diameter of the wiper layer 42 is slightly greater than the diameter of the memory disc 20, as will be explained in greater detail with reference to FIG. 3.

A front cover 44, made of a relatively thin layer of high impact plastic material, is heat formed to provide a circular recess 46 whose diameter is slightly greater than the diameter of the memory disc 20. By way of example only, the back cover 38 is 0.040 inches thick and the front cover is 0.010 inches thick in one embodiment. A circular layer of anti-static, anti-friction wiping material 48 having the same diameter as the recess 46 is inserted within the recess 46. The wiper layers 42 and 46 are made of a synthetic non-woven fibrous material. The front cover 44 together with the layer of wiping material 48, the memory disc 20, the layer of wiping material 42 and the back cover 38 are assembled together in sandwich type fashion and the front cover 44 is then bonded to the back cover 38 at all points of mutual contact around the periphery of the edge of the recess 46.

As best shown in FIG. 3, the V-shaped junction 50 of the front and back covers 44 and 38, respectively, lies in substantially the same plane as the flat surface of the back cover 38 which faces the memory disc 20. Because the junction 50 is not in the memory disc's plane of rotation there is less chance that the outer edge 52 of the memory disc can jam in the junction 50. Furthermore, the layer of cushioning material 42 has a diameter such that is outer peripheral edge abuts the junction 50 to also prevent the outer edge 52 of the memory disc 20 from becoming jammed.

The back and front covers 38 and 44, respectively, are provided with oval shaped, radially spaced holes 54 and 56, respectively, to allow the magnetic transducer head (not shown) to have access to the memory disc 20. The back and front covers 38 and 44, respectively, are also provided with holes 58 and 60, respectively, at locations which correspond to the outer edge of the memory disc 20 to allow the passage of a light beam from the disc file device (not shown) which, in combination with the holes 23 in the memory disc 20 and a photo-electric device in the disc file mechanism, generate a sector signal.

While in the above described embodiment of the invention the front cover 44 is described as being thermoformed (heat formed) to provide the recess 46, it should be apparent that in other embodiments other means, such as vacuum forming, are provided for forming the front cover with a sufficient recess to accommodate the memory disc 20.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claims.

What is claimed is:

1. A cartridge for containing a flexible, rotary, magnetic record memory disc comprising a substantially rigid first cover having an interior flat surface and a second cover which is substantially thinner than the first cover and which is deformed to provide a recess coextensive with the circumferential edge of the memory disc, the second cover having an interior surface which is bonded to the flat interior surface of the first cover along a path immediately adjacent to and exterior of the recess in the second cover to provide a circumferentially sealed cavity for housing the memory disc, the junction of the interior surface of the first and second covers lying entirely in a plane which is parallel to and spaced from the memory disc's plane of rotation.

2. A cartridge for containing a flexible, rotary memory disc as recited in claim 1 wherein the interior surfaces of the first and second covers are separated from the memory disc by a pair of anti-friction, anti-static wiper layers, the diameter of the wiper layer adjacent to the first cover being such that its outer circumferential edge abuts the junction of the first and second covers to prevent the outer peripheral edge of the memory disc from engaging with the junction.

3. A cartridge for containing a flexible, rotary memory disc as recited in claim 2 wherein the wiper layers are made of a synthetic, non-woven fibrous material.

4. A cartridge for containing a flexible, rotary memory disc as recited in claim 1 wherein the first and second covers are made of a high impact plastic material.

5. A cartridge for containing a flexible, rotary memory disc as recited in claim 4 wherein the first cover is at least four times as thick as the second cover.

6. A cartridge for containing a flexible, rotary memory disc as recited in claim 4 wherein the second cover is heat formed to provide the recess which accommodates the memory disc.

7. In a magnetic recording system, the combination comprising:

a flexible, rotary magnetic record disc; and a cartridge for containing the disc including a first cover having an interior flat surface and a second cover which is substantially thinner than the first cover and which is deformed to provide a recess coextensive with the circumferential edge of the memory disc, the second cover having an interior surface which is bonded to the flat interior surface of the first cover along a path immediately adjacent to and exterior of the recess in the second cover to provide a circumferentially sealed cavity for housing the memory disc, the junction of the interior surface of the first and second covers lying entirely in a plane which is parallel to and spaced from the memory disc's plane of rotation;

the disc being rotatable while the cartridge is stationary in the magnetic recording system.

* * * * *